(12) United States Patent
Iranpour et al.

(10) Patent No.: US 7,328,109 B2
(45) Date of Patent: Feb. 5, 2008

(54) PROCESSING SEISMIC DATA

(75) Inventors: Kambiz Iranpour, Oslo (NO); James Edward Martin, Kanagawa (JP); Julian Edward Kragh, Finchingfield (GB); Ali Özbek, Milton (GB)

(73) Assignee: Westerngeco L.L.C., Houston, TX (US)

( * ) Notice: Subject to any disclaimer, the term of this patent is extended or adjusted under 35 U.S.C. 154(b) by 0 days.

(21) Appl. No.: 11/371,808

(22) Filed: Mar. 9, 2006

(65) Prior Publication Data

US 2006/0217890 A1    Sep. 28, 2006

(30) Foreign Application Priority Data

Mar. 23, 2005  (GB) ................................. 0506260.9

(51) Int. Cl.
G01V 1/28    (2006.01)
(52) U.S. Cl. .......................................... 702/17; 702/14
(58) Field of Classification Search ................. 702/14, 702/17, 189, 190; 367/24, 38, 73, 28; 181/122
See application file for complete search history.

(56) References Cited

U.S. PATENT DOCUMENTS

| 5,448,531 A | 9/1995 | Dragoset, Jr. ................. 367/45 |
| 5,971,095 A | 10/1999 | Ozbek |
| 6,738,715 B2 * | 5/2004 | Shatilo et al. ................. 702/17 |

FOREIGN PATENT DOCUMENTS

| EP | 0 201 643 A1 | 11/1986 |
| GB | 2 237 642 A | 5/1991 |
| GB | 2 309 082 A | 7/1997 |

OTHER PUBLICATIONS

Cary et al Noise attenuation with 3-D FXY-deconvolution Canadian Society of Exploration Geophysicists Conference Abstracts, 1993, pp. 22-23.
Chase Random noise reduction by 3-D spatial prediction filtering $62^{nd}$ Annual International meeting of Society of Exploration Geophysicists, vol. 62, 1992, pp. 1152-1153.
Özbek Coherent noise attenuation by multichannel adaptive filter banks GEO 2000, $4^{th}$ Middle East Geosciences Conference and Exhibition, Bahrain, 2000 (pp. 154-155).
Özbek Coherent noise attenuation by adaptive filtering and beamforming Extended abstract L-22, EAGE $62^{nd}$ Conference and Technical Exhibition, Glascow, Scotland, 2000 (4 pages).
Özbek Multichannel adaptive interference cancelling Extended abstract SP6.5, SEG Conference, Calgary 2000 (4 pages).
Kanasewich, E.R. et al. "Nth-Root Stack Nonlinear Multichannel Filter." Geohysics, vol. 38, No. 2 (Apr. 1973), pp. 327-338.
United Kingdom Intellectual Property Office Examination Report dated Apr. 20, 2007 for Application No. GB0506260.9.

* cited by examiner

Primary Examiner—Bryan Bui
(74) Attorney, Agent, or Firm—Steven Gahlings; Vincent Loccisano; Jody Lynn DeStefanis (57) ABSTRACT

A method of processing seismic data comprises transforming seismic data which contain coherent noise to a domain in which at least some of the coherent noise is transformed to incoherent noise. The seismic data are then filtered in the new domain, to remove or attenuate the incoherent noise. If desired, the filtered data may subsequently be transformed back to the domain in which the data were acquired. The filtering process may be carried out using a multichannel interference canceller. A seismic data trace to be filtered is input to the principal channel of the interference canceller, and one or more other seismic data traces are input to the interference canceller as reference traces. Use of seismic data traces as the reference trace(s) avoids the need to determine a noise reference trace.

13 Claims, 5 Drawing Sheets

PROCESSING SEISMIC DATA

CROSS-REFERENCE TO RELATED APPLICATIONS

This application claims the benefits of priority from United Kingdom patent application number 0506260.9, filed on Mar. 23, 2005, which is commonly assigned to assignee of the present invention and hereby incorporated by reference in its entirety.

BACKGROUND OF THE INVENTION

The present invention relates to a method of processing seismic data, in particular to processing seismic data to reduce the noise content of the data.

In a seismic survey, a source of seismic energy is actuated to emit seismic waves. The seismic waves propagate into and through the earth's interior, and are partially reflected by geological features within the earth. The reflected waves may be detected by suitable sensors, generally known as "receivers". In a land-based survey, the receivers may be positioned on or below the earth's surface (for example within a borehole); in a marine seismic survey the receivers may be disposed on the sea-bed or may be disposed within a water column (as in a towed marine seismic survey). Information about the structure of the earth's interior may be derived from the seismic data acquired at the receivers following actuation of the seismic source.

One problem faced in processing seismic data is that the seismic data acquired at the receivers will contain, in addition to the desired signals caused by reflection of seismic energy by geological features within the earth, other signals that are not due to reflection of seismic energy by geological features within the earth. The signals that are not due to reflection of seismic energy by geological features within the earth are collectively referred to as "noise".

Noise in seismic data has many causes. To give one example, in a towed marine seismic survey the seismic source and the seismic receivers are towed through the water by survey vessels. The propellers, and other machinery, of these vessels will generate acoustic energy, as will other vessels and drilling rigs near the survey location. Some of this acoustic energy will be transmitted into the water column and will be detected by the seismic receivers, so causing noise in the seismic data. Attenuation of the noise in acquired seismic data is a very important part of processing seismic data, and must be carried out without affecting the desired seismic signal.

Noise may be either coherent or incoherent, and coherent noise may be spatially coherent, temporally coherent, or both. Essentially, if noise is spatially coherent it is possible to make predictions about the noise at one location from knowledge of the noise at another location, and if noise is temporally coherent it is possible to make predictions about the noise at one time from knowledge of the noise at another time.

Figure 1:
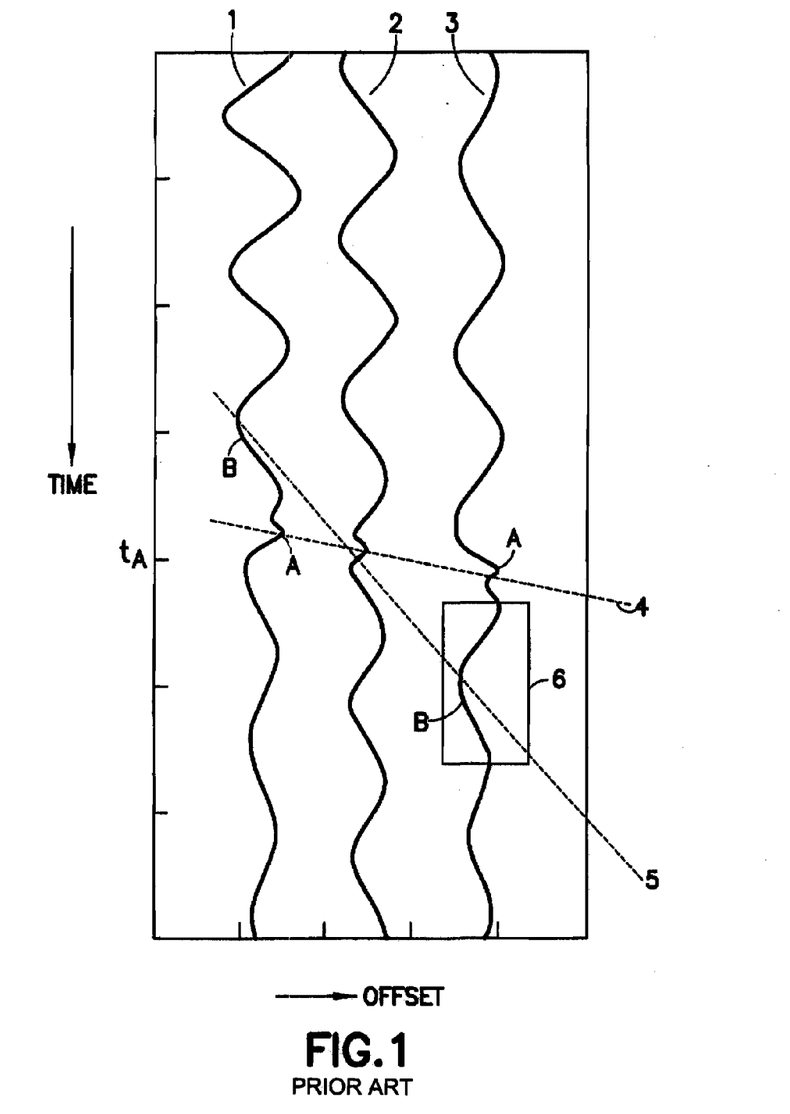
FIG. 1 illustrates a known method of attenuating noise in a seismic signal.

FIG. 1 illustrates the principle of a known method of attenuating coherent noise. FIG. 1 shows three seismic traces 1,2,3, acquired at respective spatially separated receivers. In FIG. 1, the vertical axis denotes time, and the horizontal axis denotes the offset of the trace (the "offset" of a trace is the source-to-receiver distance). Within each trace, the horizontal axis denotes the amplitude of the trace.

The traces contain a number of events. Two events are labelled: event A is assumed to be an event corresponding to reflection from a target geological feature, whereas event B is assumed to be noise. In trace 2 event A and event B occur at the same time, and the presence of event B makes it difficult to interpret event A correctly. Before trace 2 can be used to obtain information about the earth's interior it is necessary to attenuate or remove noise from the trace (or at least from the part of trace 2 around time $t_A$, where $t_A$ is the time at which event A occurs in trace 2). The removal of noise from the trace is known as filtering the trace.

The method makes use of the fact that the variation in arrival time with offset—or "moveout"—for the desired event A is not the same as the moveout for the noise event B. This is indicated by the lines 4, 5 in FIG. 1 which show, respectively, the moveout of events A and B. The events A and B do not therefore occur at the same time in traces 1 and 3. It is therefore possible to derive a noise reference signal, which contains just event B, from trace 1 or 3. The reference signal may be derived from, for example, the region of trace 3 enclosed by the box 6. Since the noise event B is coherent between the traces, the noise reference signal derived from trace 1 or 3 should be a good estimate of the noise event B in trace 2. The noise reference signal may then be used to filter trace 2 (strictly, the reference signal derived from region 6 is used to filter a region of trace 2 around time $t_A$).

Figure 3A:
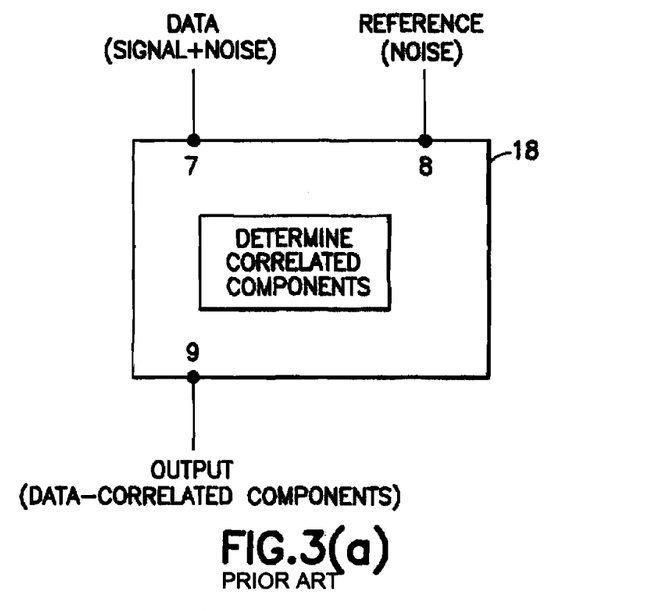
FIG. 3(a) illustrates a conventional multi-channel interference canceller.

The filtering process may be carried out using a multi-channel interference canceller 18 (or multichannel "filter"), as shown in FIG. 3(a). In its broadest term, an "interference canceller" is a device that receives as input a signal containing a desired component and an interfering component, and provides as an output a signal from which the interfering component has been cancelled (or substantially cancelled). The data trace that is to be filtered (in this case, trace 2), which is assumed to contain signal and coherent noise, is input into the primary channel 7 of the interference canceller 18. A reference signal derived from trace 1 or trace 3 is input into a reference channel 8 of the interference canceller. (In practice, the interference canceller 18 contains more than one reference channel, but only one reference channel 8 is shown in FIG. 3(a) for simplicity). The reference signal is a noise reference signal, and is essentially an estimate of the noise component of the data trace applied to the primary channel. The noise reference signal may be obtained as described above.

The interference canceller determines the parts of the data trace that are correlated with the noise reference signal. The correlated components are assumed to represent the noise in the data trace. An estimate of the signal component of the data trace is therefore obtained by subtracting the correlated components (which are taken to be an estimate of the noise in the data trace) from the data trace. This residual signal is then output from the output channel 9, as the estimate of the signal component of the data trace.

One interference canceller suitable for use with the method of FIGS. 1 and 3(a) is described in UK patent No. 2 309 082 and U.S. Pat. No. 5,971,095, the contents of which are hereby incorporated by reference. These disclose a multi-channel adaptive interference canceller, referred to as the ACONA adaptive interference canceller. The ACONA interference canceller has as its inputs a principal channel, to which the signal to be filtered is input, and one or more reference channels to which reference data are input. The interference canceller removes components in the signal input to the principal channel that are highly correlated with the reference data input to the reference channel(s), and outputs the residual signal that remains after removal of these components. The ACONA interference canceller is particularly effective at removing the noise component from the input data trace.

It is however difficult to apply the method of FIG. 1 if the moveout of the noise is similar to the moveout of the signal of interest. In this case, it is hard to derive a reliable noise reference signal.

A method of reformatting seismic data from common shot gathers to common receiver gathers to suppress noise is described for example in the European patent application EP-0201643. A method of transforming the balance of coherent events into into incoherent events in seismic data is described in the United Kingdom application GB-2237642 A.

SUMMARY OF INVENTION

A first aspect of the present invention provides a method of processing seismic data, the method comprising the steps of: transforming seismic data from a first domain in which the seismic data contain a signal of interest and coherent noise to a second domain thereby to transform at least part of the coherent noise to incoherent noise; and filtering at least a first portion of the seismic data in the second domain.

The first portion of the seismic data may be a complete data trace. Alternatively, the first portion of the seismic data may be a time-windowed portion of a data trace about an event of interest in the trace.

The first domain may be the domain in which the seismic data were acquired.

In marine seismic surveying, for example, water-borne noise may be coherent in the common shot domain. Furthermore, in the common shot domain the moveout and bandwidth of water-borne noise may be similar to the moveout and bandwidth of the signal of interest, so that it may be difficult to apply the method of FIG. 1. In other domains, however, such as the common-receiver domain or the common offset domain, the water-borne noise is spatially incoherent. Transforming seismic data to a domain in which noise in the data is incoherent, so as to transform coherent noise to incoherent noise, allows efficient attenuation of the noise in the second domain.

Depending on the cause(s) of the coherent noise in the seismic data, all coherent noise in the seismic data may be transformed to incoherent noise when the seismic data are transformed to the second domain. It should however be noted that some noise that is coherent in the first domain may remain as coherent noise when the seismic data are transformed to the second domain. Any noise that remains as coherent noise when the seismic data are transformed to the second domain may be removed from or attenuated in the transformed seismic data using any suitable technique for removal or attenuation of coherent noise.

If desired, the filtered data may subsequently be transformed back to the first domain, for example for further processing.

A second aspect of the present invention provides a method of processing seismic data containing a signal of interest and incoherent noise, the method comprising inputting a first portion of the seismic data to the principal channel of a multi-channel interference canceller; wherein the method further comprises inputting a signal reference signal to a reference channel of the interference canceller.

In a conventional method of filtering seismic data using a multichannel interference canceller, the seismic data to be filtered (which are assumed to comprise a signal of interest and noise) are applied to the principal channel, and a noise reference signal is applied to a reference channel. The interference canceller essentially determines which components of the seismic data are correlated with the noise reference signal, and these components are assumed to be noise. It is assumed that the residual signal that is left after removal of the components of the seismic data that are found to be correlated with the noise reference signal represents the signal of interest in the original seismic data.

In a method of the second aspect of the invention, however, the input to the primary channel is seismic data that contain a signal of interest and incoherent noise. The input to the reference channel is a signal reference signal, that also contains a signal of interest and incoherent noise. The interference canceller again determines which components of the input to the primary channel are correlated with the reference channel—but in the method of the invention these components are the signal of interest. Since the noise is incoherent between the signal input to the primary channel and the signal input to the reference channel, the noise in the primary channel does not correlate with the noise in the reference channel. In the method of the invention, therefore, the signal of interest is found directly, rather than as a residual signal.

A method according to this aspect of the invention does not require an estimate of the noise content of the signal of interest, since a data trace is used as the reference signal.

In a case where the seismic data contain coherent noise and incoherent noise, the coherent noise will not be removed since the coherent noise in the primary. channel would correlate with the coherent noise in the reference channel. In this case, therefore, the output from the interference canceller will contain coherent noise in addition to the signal of interest. The coherent noise may, as explained above, be removed by any suitable technique.

A third aspect of the present invention provides an apparatus for processing seismic data, and comprising: means for transforming seismic data from a first domain in which the seismic data contain a signal of interest and coherent noise to a second domain in which at least part of the coherent noise is transformed to incoherent noise; and means for filtering a first portion of the seismic data in the second domain.

A fourth aspect of the present invention provides an apparatus for processing seismic data containing a signal of interest and incoherent noise, the apparatus comprising a multi-channel interference canceller having a principal channel for receiving a first portion of the seismic data and a reference channel for receiving a signal reference signal.

An apparatus of the third or fourth aspect may comprise a programmable data processor.

A fifth aspect of the present invention provides a storage medium containing a program for the data processor of an apparatus as defined above.

A sixth aspect of the present invention provides storage medium containing a program for controlling a programmable data processor to carry out a method of the first or second aspect.

BRIEF DESCRIPTION OF THE DRAWINGS

Preferred embodiments of the present invention will now be described by way of illustrative example with reference to the accompanying figures in which.

DETAILED DESCRIPTION

The present invention makes use of the fact that noise that is coherent in one domain may be incoherent in another domain. FIG. 1, for example, shows seismic traces in the common shot domain—that is, the traces 1, 2 and 3 of FIG. 1 were recorded at the same time but at different, spatially separated, receivers in consequence of a single actuation of a seismic source. Noise arising from, for example, propellers of a survey vessel (in the case of a marine seismic survey) is likely to be coherent from one trace to another in the common shot domain.

In other spatial domains, however, water-borne noise is likely to be spatially incoherent. In the common receiver domain, for example, a gather of traces contains traces recorded at a single receiver at different times, as a consequence of a number of different actuations of a seismic source. Since the traces are recorded at different times, water-borne noise is likely to be spatially incoherence from one trace to another. Similarly, water-borne noise is likely to be spatially incoherent in the common-offset domain. The seismic signals of interest, however, remain spatially coherent from one trace to another in the common-receiver domain or in the common-offset domain.

Figure 2:
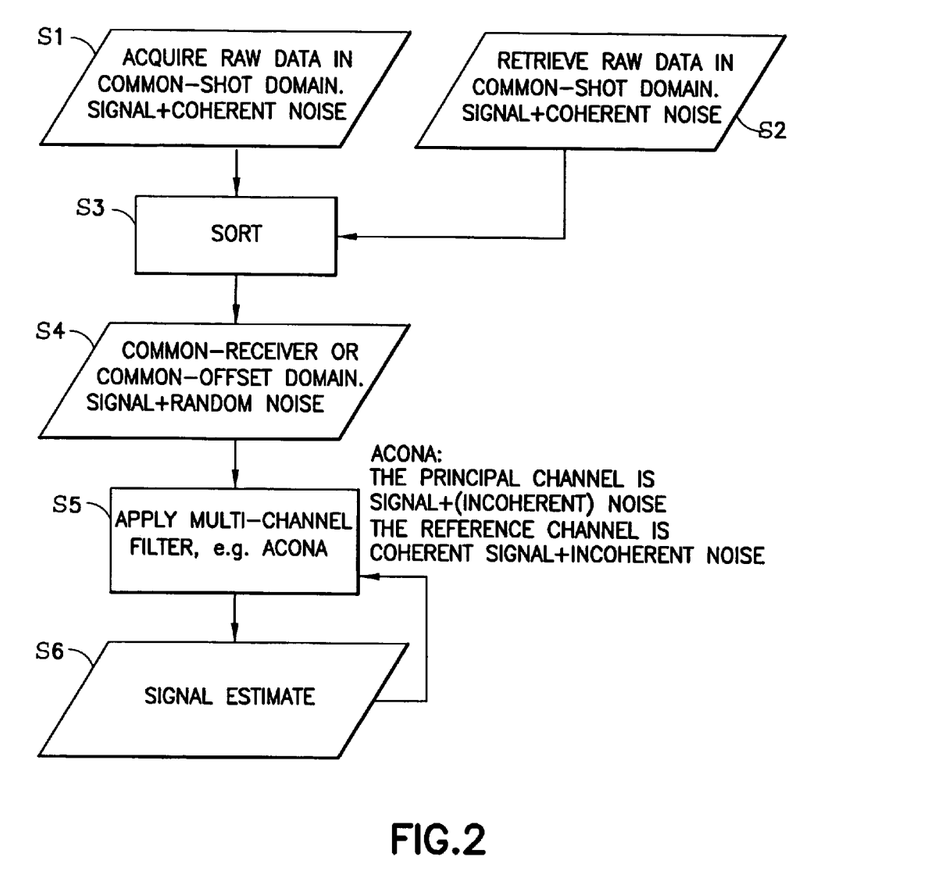
FIG. 2 is a block flow diagram of a method of the present invention.

In the method of FIG. 2, therefore, seismic data are initially acquired at step S1. It is assumed that these data are acquired in the common-shot domain by actuating a seismic source and recording seismic data traces at each of a number of spatially separated receivers. The source is then actuated at another location, and another group (or "gather") of seismic data traces are obtained. The processes of actuating the source and recording a gather of seismic data traces is repeated as often as necessary. Each gather of traces obtained at step S1 resembles FIG. 1, with each trace containing a signal of interest and noise, with the noise being coherent from one trace to another in a gather.

The invention may alternatively be applied to pre-existing seismic data. In this case, step 1 is replaced by the step S2 of retrieving pre-existing common-shot domain seismic data from storage.

Next, at step S3, the raw data traces are transformed into a different domain, for example by sorting the traces into another domain. The result, as indicated at step S4, is data traces sorted in, for example, the common-receiver domain or the common-offset domain. As explained above, each raw data trace in a gather now contains the signal of interest and noise that is random (incoherent) between traces within a gather. The signal of interest, however, will be essentially coherent from trace to trace within a gather. In the case of a common-receiver gather, for example, the gather contains traces acquired at a single receiver but in different shots. The signal of interest recorded at a particular receiver is unlikely to vary significantly from one shot to another (if the shot-to-shot distance is small), since the position of the receiver and the earth's structure in the vicinity of the receiver do not change from one shot to the next.

The problem of attenuating noise in the data traces has now been converted to the problem of separating the components of the data traces that are coherent from one trace in the gather to another trace in the gather (i.e., the desired signal components) from components that are incoherent between traces in a gather (the noise component). This may be carried out using a conventional multi-channel interference canceller of the type described above with reference to FIG. 3(a). In particular, the ACONA adaptive interference canceller of GB patent No. 2 309 082 may be used to attenuate the noise in the data traces.

Thus, at step S5 one data trace is filtered and this step will be described in more detail below.

Finally, the estimate of the signal component of the data trace is output at step S6.

Steps S5 and S6 are then repeated for other data traces.

The filtered data traces may then be displayed and/or subjected to further processing steps (not shown in FIG. 2). If desired, the display or further processing steps may comprise re-sorting the filtered data traces into the common shot domain.

It should be noted that, depending on the causes of the noise in the original seismic data, some noise that is coherent noise in the first domain may remain as coherent noise when the seismic data are transformed to the second domain at step S3. One or more further noise removal or attenuation steps (not shown in FIG. 2) may be applied to the transformed seismic data to remove any noise in the seismic data that remains as coherent noise after step S3 has been carried out. These further noise removal/attenuation steps may comprise any suitable technique for removal or attenuation of coherent noise.

Step S5 of the method of FIG. 2 is preferably carried out using a conventional multi-channel interference canceller, such as the ACONA interference canceller. The way in which the interference canceller is used in the method of FIG. 2 is, however, different from the conventional manner in which the interference canceller is used. This will be described with reference to FIG. 3(b).

Figure 3B:
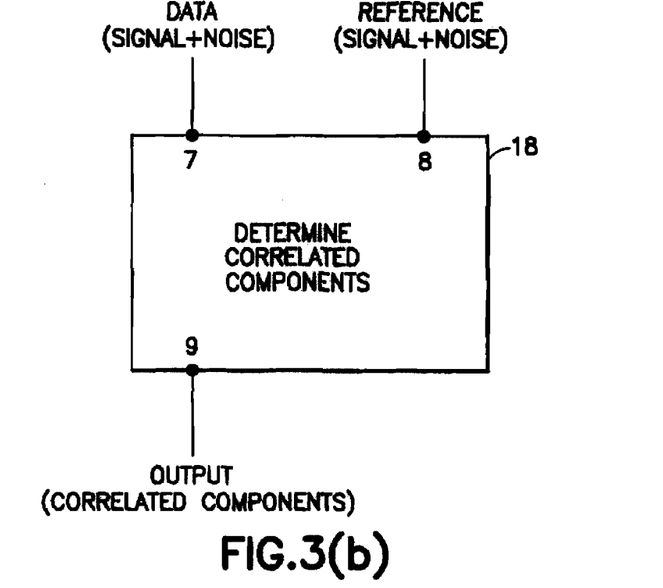
FIG. 3(b) illustrates a multi-channel interference canceller of the present invention.

FIG. 3(b) illustrates the filtering process of the method of FIG. 2. In this method the data trace to be filtered is again applied to the principal channel 7 of the interference canceller 18. The data trace to be filtered is again assumed to contain a desired signal of interest and noise.

In the method of FIG. 3(b), the reference signal applied to the reference channel 8 is not a noise reference signal, but is a signal reference signal. That is, the reference signal again includes a signal component and a noise component. In principle the reference signal may be any signal with a signal component that is a reliable estimate of the signal component of the data trace to be filtered. In a particularly preferred embodiment, the reference signal is one or more other data traces from the common-receiver gather, or common offset gather, to which the data trace input to the principal channel 7 belongs. Where another trace from the gather is used as the reference signal the signal component is, as explained above, coherent between the data trace and the reference signal, whereas the noise component is incoherent between the data trace and the reference signal. Preferably, an adjacent or nearly adjacent trace would be used as the reference trace. ("Adjacent traces" are defined as traces that either have similar offset to one another or have similar positions with respect to the earth's surface. The lateral resolution determines whether a particular trace can be used as the reference trace.)

The interference canceller 18 again determines the part of the data trace that is correlated with the reference signal. However, the correlated component now represents the signal of interest, since this is the component that is common to the data trace and the reference trace. This is in contrast to the prior method of FIG. 3(a) in which the correlated component represented the noise component. That is, the method of FIG. 3(b) determines the signal component directly, as compared to the method of FIG. 3(a) which determines the signal component as the residual. The correlated component of the data is therefore simply output on the output channel 9. (It is to be noted that, where a single reference trace is used, interchanging the trace input to the principal channel of the interference canceller with the trace input to the reference channel would normally produce a different output from the interference canceller. The information of the reference trace is used to filter the trace input to the principal channel, and the output is the filtered version of the trace input to the principal channel.)

The method of FIG. 3(b) has the further advantage that it is not necessary to determine a noise reference signal. One or more other data traces from the same gather as the data trace to be filtered can simply be used as the input to the reference channel of the interference canceller. (In practice, a multi-channel interference canceller has two or more reference inputs, so that two or more traces will be used as reference inputs.) The method of FIG. 3(b) requires that at least some of the noise is incoherent between traces. The method of FIG. 3(b) cannot be applied in a domain in which all noise in the seismic data is coherent between traces.

In the above description of the invention, a complete data trace has been input to the principal channel 7 of the interference canceller. In principle, however, it is not necessary to input a complete data trace, and the method could be implemented using a portion of a data trace, for example a time-windowed portion of a trace about an event of interest, as the input to the primary channel of the interference canceller. Where a portion of a data trace is used as the input to the primary channel of the interference canceller, the input to the reference channel may be a portion of one or more other data traces. Use of portions of data traces will reduce the computation required, compared to the use of complete data traces.

Figure 4A:
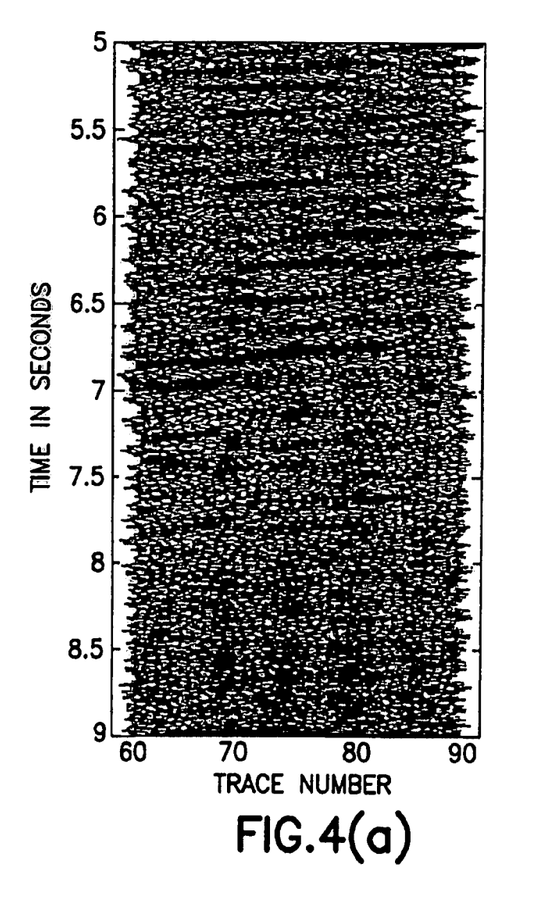
FIGS. 4(a) and 4(b) illustrate results of a method of the present invention.
Figure 4B:
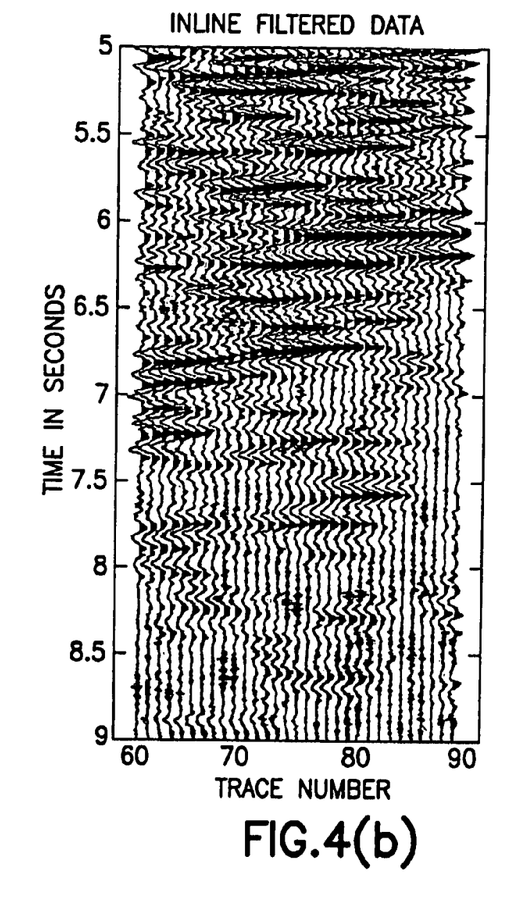

FIGS. 4(a) and 4(b) illustrate results obtained by method of the present invention. FIG. 4(a) shows typical raw data acquired in the common-shot domain. The data have the general form shown in FIG. 1, but it will be seen that the data contain a high level of noise. While some general features can be distinguished in FIG. 4(a), it is not possible to obtain any detailed information by simple visual inspection of the data. Indeed, the individual data traces cannot be determined in FIG. 4(a).

FIG. 4(b) shows the results of filtering the data of FIG. 4(a) according to the method of FIG. 2. The data traces of FIG. 4(a) were converted to the common receiver domain, filtered according to the method of FIG. 3(b) and then re-converted to the common shot domain. It will be seen that the noise has been suppressed to a remarkable extent.

In principle, step S5 of FIG. 2 may employ any conventional method of separating a wavefield into its incoherent constituents and its coherent constituents. For example, F-X deconvolution may be used. The general principles of F-X de-convolution are described by, for example, M. Chase in "Random noise reduction by FXY prediction filtering", 62nd SEG Convention Abstracts, pp. 1152-1153 (1992) and by P. Cary and W. Upham in "Noise attenuation with 3D FXY deconvolution", CSEG Convention Abstracts, pp. 22-23 (1993). The use of the ACONA adaptive interference canceller is, however, preferred since it requires only a small number (one or two) reference traces in order to filter a data trace. This results in less smearing of the signal (that is, in less mixing of the signal between the traces used for filtering), and also means that less computer memory is required for the filtering process.

The ACONA adaptive interference canceller does not require that the wavefield is sampled regularly. Use of the ACONA adaptive interference canceller therefore enables the method of the invention to be applied to data acquired with a 2-D survey geometry, a 3-D survey geometry or an irregular survey geometry to be handled.

The ACONA adaptive interference canceller is a local interference canceller, and this provides good filtering of all acquired data.

Figure 5:
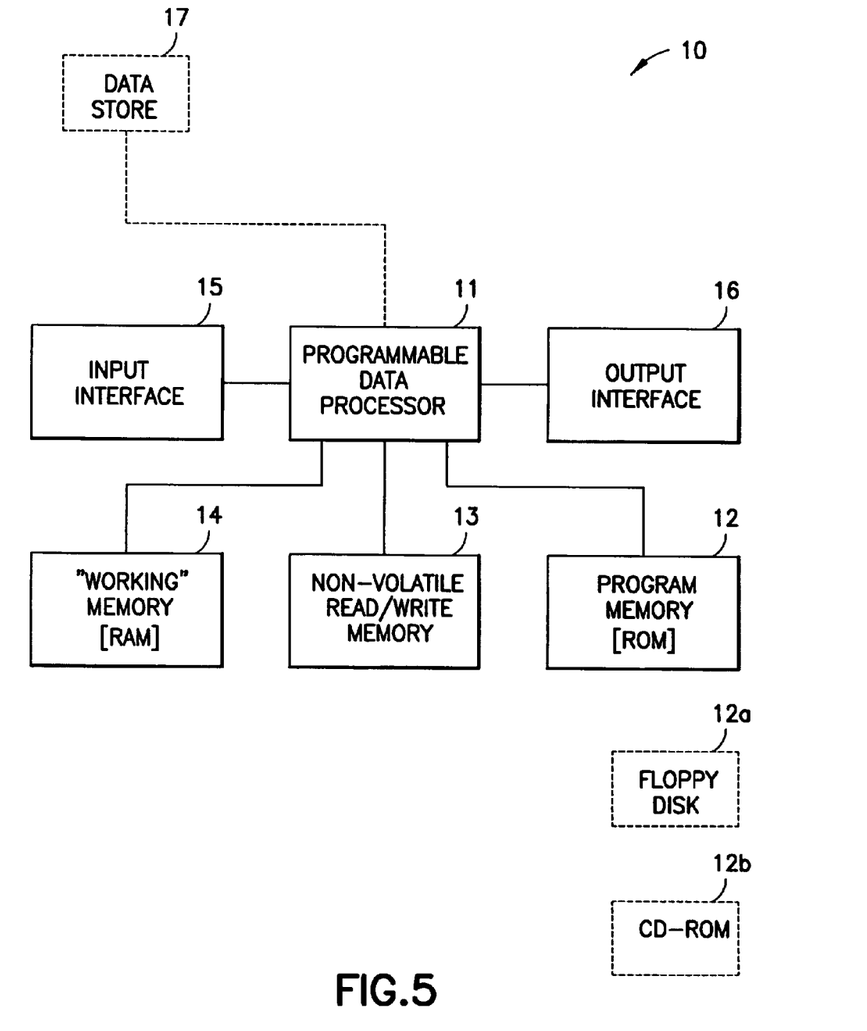
FIG. 5 is a block schematic diagram of an apparatus according to the present invention.

FIG. 5 is a schematic block diagram of a programmable apparatus 10 according to the present invention. The apparatus comprises a programmable data process 11 with a programme memory 12, for instance in the form of a read-only memory (ROM), storing a programme for controlling the data processor 11 to perform any of the processing methods described above. The apparatus further comprises non-volatile read/write memory 13 for storing, for example, any data which must be retained in the absence of power supply. A "working" or scratch pad memory for the data processor is provided by a random access memory (RAM) 14. An input interface 15 is provided, for instance for receiving commands and data. An output interface 16 is provided, for instance for displaying information relating to the progress and result of the method. Seismic data for processing may be supplied via the input interface 14, or may alternatively be retrieved from a machine-readable data store 17.

The programme for operating the system and for performing the method described hereinbefore is stored in the programme memory 12, which may be embodied as a semi-conductor memory, for instance of the well-known ROM type. However, the programme may be stored in any other suitable storage medium, such as magnetic data carrier 12a, such as a "floppy disk" or CD-ROM 12b.

What is claimed is:

1. A method of processing seismic data comprising the steps of:

transforming seismic data from a first domain in which the seismic data contain a signal of interest and coherent noise to a second domain thereby to transform at least part of the coherent noise to incoherent noise;

filtering at least a first portion of the seismic data in the second domain using a multichannel interference canceller, wherein the seismic data in the second domain comprise a gather of seismic data traces, and comprising: inputting a first seismic data trace of the gather to the principle channel of the interference canceller as the first portion of the seismic data;

inputting a second seismic data trace of the gather to the reference channel of the interference canceller as a reference signal containing signal of interest and incoherent noise; and wherein the interference canceller outputs components of the first portion of the seismic data that are correlated with the reference signal.

2. A method as claimed in claim 1 wherein the multichannel interference canceller is an adaptive multichannel interference canceller.

3. A method as claimed in claim 1 wherein the second domain is the common receiver domain.

4. A method as claimed in claim 1 wherein the second domain is the common offset domain.

5. A method as claimed in claim 1 wherein the first domain is the common shot domain.

6. A method as claimed in claim 1 wherein the seismic data were acquired in the first domain.

7. A method as claimed in claim 1 wherein all coherent noise in the seismic data is transformed to incoherent noise when the seismic data are transformed to the second domain.

8. An apparatus for processing seismic data containing a signal of interest and incoherent noise, the apparatus comprising a interference canceller having a principal channel for receiving a first portion of the seismic data and a reference channel for receiving a signal reference signal, wherein the seismic data in the second domain comprise a gather of seismic data traces, and the first portion of seismic data is a first seismic data trace of the gather; and the reference channel of the interference canceller receives a second seismic data trace of the gather to as a reference signal containing signal of interest and incoherent noise.

9. An apparatus as claimed in claim 8 and adapted to output the components of the first portion of the seismic data that are correlated with the reference signal to a reference channel of the interference canceller.

10. An apparatus as claimed in claim 8 wherein the interference canceller is an adaptive interference canceller.

11. An apparatus as claimed claim 8 and comprising a programmable data processor.

12. A storage medium containing a program for the data processor of an apparatus as defined in claim 11.

13. An apparatus as claimed in claim 8 wherein the interference canceller is a multi-channel interference canceller.

* * * * *